United States Patent Office 3,497,464
Patented Feb. 24, 1970

3,497,464
**INORGANIC ALUMINUM-OXYGEN-PHOS-
PHOROUS BOND POLYMERS**
Roger F. Monroe and Donald L. Schmidt, Midland, Mich.,
assignors to The Dow Chemical Company, Midland,
Mich., a corporation of Delaware
No Drawing. Filed July 26, 1967, Ser. No. 656,062
Int. Cl. C08g *33/20, 33/16*
U.S. Cl. 260—2                        7 Claims

ABSTRACT OF THE DISCLOSURE

This invention is concerned with novel inorganic polymers based on aluminum, oxygen and phosphorus wherein there is an aluminum-oxygen-phosphorus bonding. The polymers are prepared by reacting an aluminum monofluoride, e.g. aluminum monofluorohalide or the corresponding aluminum monofluoroalkoxides, with an alkyl orthophosphate.

BACKGROUND OF THE INVENTION

The present invention is related to inorganic polymers and more particularly is concerned with novel aluminum-oxygen-phosphorus bond-containing polymers and to a method for their preparation. The term "inorganic polymers" as used herein is in accordance with the generally accepted definition which defines such materials as not containing any carbon in the polymer backbone, i.e. chain.

To date, the most widely known inorganic polymers are the silicones based on linear chains and alternating silicon-oxygen bonds.

Additionally, network structures of aluminum-oxygen-phosphorus have been prepared by the reaction of ortho-phosphoric acid and aluminum oxide (H. S. Greger, U.S. 2,460,344; Callis et al., Chem. Reviews, 54, 777 (1954)). The product of the reaction from these components is a viscous fluid which can be dried to an amorphous material believed to be a three-dimensional network of Al—O—P chains. These phosphate materials have been used as insulating coatings and as binders (Eubanks et al., NASA Tech., Note D-106, November 1959). Also they are alleged to have some application at high temperatures of up to 3500° F.

Several papers have been presented reporting attempts to prepare polymer chains which include aluminum, oxygen and phosphorus atoms. One is directed to the reaction of butylmethylphosphonochloridate with aluminumtributoxide (Andrianov et al., J. Polymer Science, 30, 513 (1958)). A second paper by the same authors is directed to the reaction of aluminum isopropoxide with dialkyl esters of methylphosphonic acid (Andrianov et al., Izv. Akad. Nauk. SSSR, Otd. Khim. Nauk. 1753 (1962); C.A., 58, 79 (1965)). Also the reaction of aluminum isopropoxide with trialkyl esters of phosphonic acid has been published by Andrianov et al., Izv. Akad. Nauk. SSSR, Ser. Khim. (9) 1660, (1963); C.A., 58, 15165.

However, the products resulting from the reactions carried out by Andrianov et al. all had low degrees of polymerization and mixtures were obtained in substantially all of the preparations.

Additionally, phosphorus-oxygen-metal double bridge polymers of the structures corresponding to

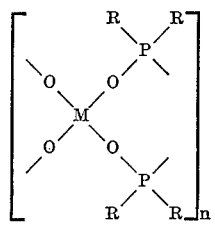

have been reported reported [(Block et al., J. Am. Chem. Soc. 84, 3200 (1962); Crescenzi et al., J. Am. Chem. Soc. 87, 391 (1965); Montermosa, Rubber Chem. Technol., 34, 1521 (1961)]. M is a metal and R represents organic aliphatic or aryl groups. In these compositions, the metal M is tetrahedral in configuration having two primary valence bonds and two coordination bonds. Zinc (II) and cobalt (II) specifically are discussed as the metals employed. The polymers reported in the journal articles listed directly hereinbefore are prepared by reacting a divalent metal chloride such as zinc (II) chloride and cobalt (II) chloride and phosphinic acids.

SUMMARY OF THE INVENTION

The present invention comprises reacting a monofluoride of a Group III metal source material, in the form of the metal fluorochloride, bromide, iodide or alkoxide, with an alkyl ortho-phosphonate in an inert solvent at a maximum temperature of about 200°, and ordinarily at a maximum temperature of about 20° C., and recovering a solid metal-oxygen-phosphorus linked polymeric structure therefrom. As used herein, the term "Group III metal source material" shall refer to a fluorochloride, fluorobromide, fluoroiodide or fluoroalkoxide of any metal except boron of Group III of the periodic table. Aluminum is the preferred Group III metal source material. The polymer prepared therefrom is characterized by having three primary valent bonds therein and further, depending on the alkyl orthophosphonate employed, exhibits coordination bonds and coordination number of 5.

It is a principal advantage of the present invention to provide novel relatively long chain inorganic polymers suitable for use in flame-retardant applications, as viscosity improvers for hydrocarbon oils and for forming shaped articles such as gaskets.

DESCRIPTION OF THE PREFERRED EMBODIMENTS

More particularly, the novel polymer of the present invention is prepared by reacting a Group III metal source material having an empirical formula selected from the group consisting of $X_2AlF \cdot n(THF)$ and $FAl(OR)_2$ wherein X is a chlorine, bromine or iodine radical, $n$ is a value from 0 to 3, THF represents tetrahydrofuran and R is an alkyl, or cyclo alkyl radical having from 1 to 12 carbon atoms with an alkyl orthophosphate at a maximum temperature of about 200° C. In this process, the reactants are usually employed in about the stoichiometric quantities required for preparation of a preferred embodiment of the polymer product.

The alkyl orthophosphates useful herein are depicted in structural form as

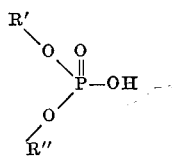

wherein R' and R" are independently selected from aliphatic alkyl, aryl or aralkyl groups or the corresponding substituted groups, e.g. halogen substituted, wherein the number of carbons present in each of the R', R" groups ranges from 1 to about 25. Examples of suitable orthophosphates includes bishexadecyl, ethyl dodecyl, n-butyl dodecyl, n-butyl hexadecyl, isobutyl dodecyl, octyl oleyl, hexyl oleyl, methyl oleyl, n-propyl oleyl, isopropyl oleyl and n-butyl oleyl orthophosphates.

The reaction herein is usually conducted in a suitable solvent for the reaction. Suitable solvents include such materials as hexane, heptane, xylene, benzene, kerosene and the like.

The solution concentrations to be used are not critical. Maximum concentrations ordinarily are those such that the reactants are completely dissolved therein at the operating conditions. Extremely dilute solutions are somewhat undesirable in that they are unwieldy to handle, require large storage and processing equipment and can make the separation of the solid product a time consuming operation. For most operations reactant solutions ranging in concentration from about 0.001 to about 0.1 molar with respect to the reactant solutes are used.

The actual preparation of the present novel polymer is carried out by heating a solution of the reactants at a predetermined temperature for a time sufficient to achieve the desired polymerization.

For optimum product yield and purity all processing operations including the initial solution preparation are carried out in a substantially anhydrous inert atmosphere, e.g. nitrogen or argon. Also all reactants and solvents preferably are dried so as to be substantially anhydrous prior to use in the process.

By preselecting the Group III metal source material from those operable materials disclosed herein, it is an unexpected advantage of the present invention that the polymeric products of specific composition and characteristics can be prepared.

In general, the polymer prepared herein has a configuration which is designated as follows:

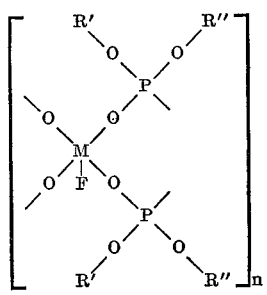

In the above depicted formula for these polymer configurations, the group designations R' and R" are as indicated hereinbefore. The letter $n$ represents an integer greater than 1 and M is a metal selected from the group consisting of aluminum, scandium, gallium, yttrium, indium and thallium. Such polymers are useful as adhesives, coating and gasketing material and as viscosity improvers for lubricating oils.

The following example will serve to further illustrate the present invention but is not meant to limit it thereto.

EXAMPLE 1

Preparation of the adduct of dichlorofluoro aluminum-tetrahydrofuran adduct and ethyl oleyl phosphoric acid Into a stirred reaction vessel equipped with a reflux condenser was added 75.2 grams (0.2 moles) of ethyl oleyl orthophosphoric acid dissolved in 100 milliliters of benzene and 26.1 grams (0.1 mole) of $AlCl_2F \cdot 2THF$ complex dissolved in 300 ml. of benzene. The reaction mixture was then refluxed for about 40 hours at which time no additional hydrochloric acid was being given off. The polymer product was then separated from the benzene solvent and dried. The product was an amber rubbery solid having a softening point at 85° C. having a molecular weight of about 1500. Elemental analysis showed the polymer to contain 7.2% P and 3.9% Al.

Various modifications can be made in the present invention without departing from the spirit or scope thereof.

We claim:

1. A method for preparing a metal-oxygen-phosphorus inorganic polymer which comprises reacting a Group III metal source material selected from the group consisting of fluorochloride, fluorobromide, fluoroiodide, and fluoroalkoxide containing from 1 to 12 carbon atoms in the alkoxide group, of aluminum, scandium, gallium, yttrium, indium, thallium with a substantially equimolar proportion of an alkyl orthophosphate having the formula

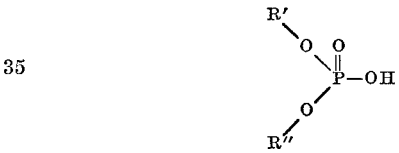

wherein R' and R" are independently selected from alkyl groups having from 1 to about 25 carbon atoms at a maximum temperature of about 200° C. and separating a solid aluminum-oxygen-phosphorus linked inorganic polymeric product from the reaction mass.

2. The process as defined in claim 1 wherein the reaction is carried out in an inert solvent at a maximum temperature of about 20° C.

3. The process as defined in claim 2 wherein the Group III metal source material is a compound having the formula $X_2AlF \cdot n(THF)$ wherein X is a chlorine, bromine or iodine radical, $n$ is a number from 0 to 3 and THF represents tetrahydrofuran.

4. The process as defined in claim 2 wherein the Group III metal source material is a compound having the formula $FAl(OR)_2$ wherein R is an alkyl radical having from 1 to 12 carbon atoms.

5. A solid metal-oxygen-phosphorus inorganic polymer having the formula

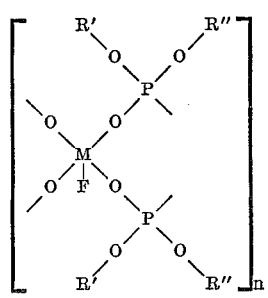

wherein M is a metal selected from the group consisting of aluminum, scandium, gallium, yttrium, indium and thallium, R' and R'' independently are selected from alkyl groups containing from 1 to about 25 carbon atoms and $n$ is an integer greater than 1.

6. The composition of claim 5 wherein M is aluminum.

7. The composition of claim 6 wherein R' is an ethyl group and R'' is an alkyl group containing from 1 to about 25 carbon atoms.

References Cited

UNITED STATES PATENTS 2,512,063  6/1950  Kreidl et al. _____ 260—2
3,197,436  7/1965  Block et al. _____ 260—2

SAMUEL H. BLECH, Primary Examiner

U.S. Cl. X.R.

117—161; 156—327; 161—191; 252—49.7; 260—346.1, 448